United States Patent Office 2,886,283
Patented May 12, 1959

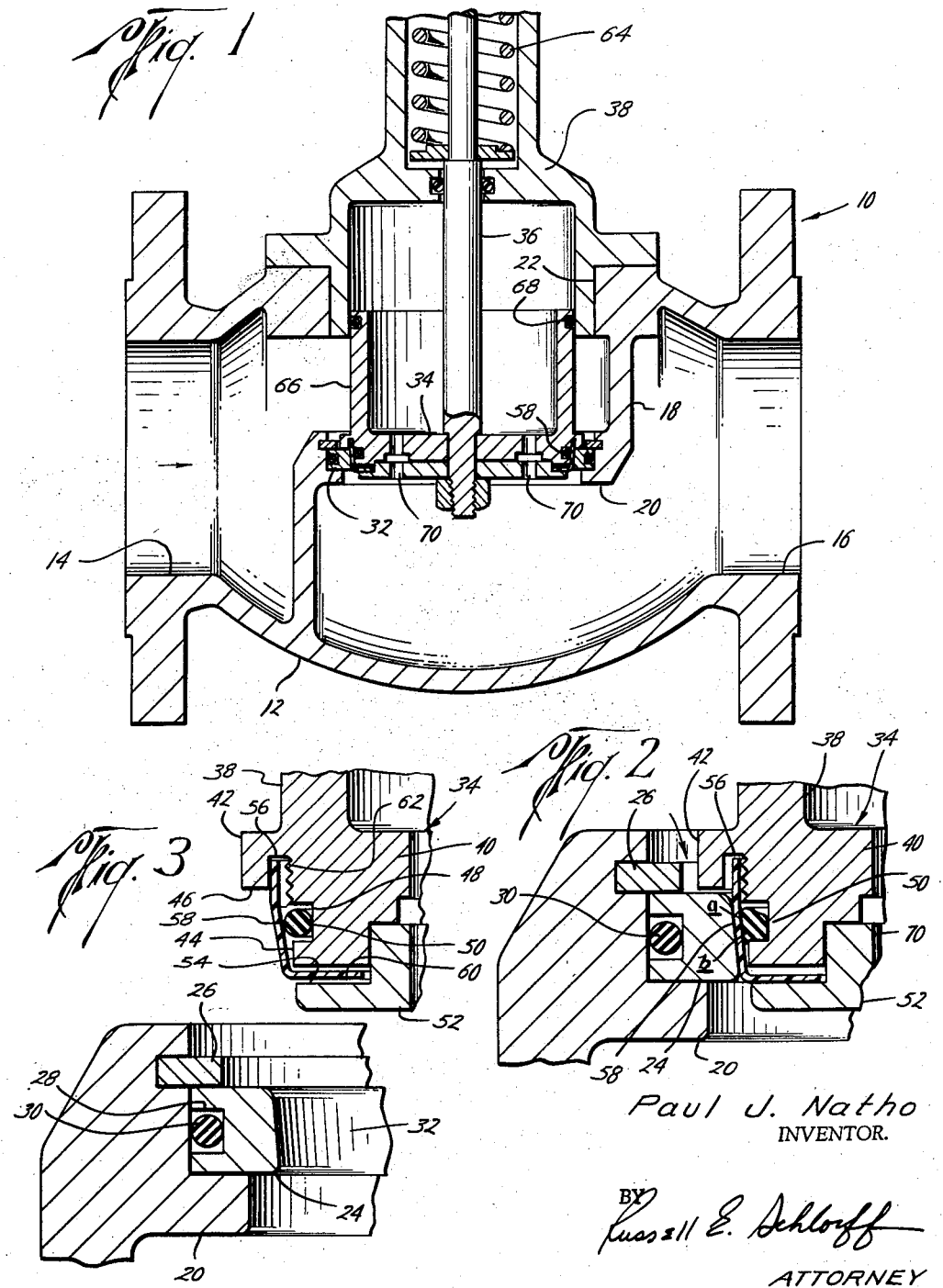

2,886,283

SEAT AND SEAL

Paul J. Natho, Houston, Tex., assignor to ACF Industries, Incorporated, New York, N.Y., a corporation of New Jersey Application January 30, 1958, Serial No. 712,134

10 Claims. (Cl. 251—175)

This invention relates to valves and more particularly to a sealing means for valves of the type utilizing a movable valve member and a stationary seat member.

Globe valves and other poppet type valves having a valve member which is moved away from a stationary valve seat in open position and contacts such valve seat in closed position are normally sealed by the utilization of considerable force urging the movable valve member into contact with the seat. O-ring type seals which make possible a bubble type seal without requiring undue force have also been utilized. However, since the O-ring would be washed away by flow of fluid through the valve, various supplementary guards for the O-rings have been used. The present invention discloses a movable valve member having an O-ring surrounded by a lipped band of resilient material. The ends of the lipped band are held loosely captive; therefore, pressure from either direction can enter behind said band and energize the O-ring; while at the same time, the band can not be dislodged. By utilizing such construction, the O-ring can be placed about the movable member, still energized by flow from either direction, and at the same time protected from being washed away by flow through the valve.

It is the general object of this invention to provide a novel and improved type of seal for valves having a stationary seat and a valve member which is withdrawn from such seat in the open position.

It is a further object to provide an improved O-ring type seal construction for a poppet type valve in which a resilient band guards the O-ring against displacement.

It was further found that in control valves which are required to be balanced to seal against back pressure that it is desirable to have the valve seat at the same place each time so that the area to be balanced can be ascertained with certainty. The seal construction of the present invention lends itself for utilization in such valves, as it will always seal at the point of contact of the O-ring. It was also found that by using a taper of approximately 5° for the seat and valve member, that the areas to be balanced are almost equal initially and that the change in diameter of seating area is kept to a minimum. The utilization of a slight taper has the further advantage in that, in opening against flow, the seal wants to hold as long as possible; and with a small taper, the tendency to stretch the seal is minimized.

Therefore, it is another object to provide an improved seal for a poppet type valve in which the valve member and seat have a minimum taper.

It is a further object to provide a balanced control valve having a seating area in which changes are kept to a minimum.

It is a further object to provide an improved seal construction for a balanced control valve in which the surfaces to be balanced are initially approximately equal.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a vertical cross section of a balanced control valve provided with the improved seal of the present invention.

Fig. 2 is an enlarged view of the seat construction shown in Fig. 1 in the closed position.

Fig. 3 is a view similar to Fig. 2 in the open position.

A globe type balanced control valve 10 having the improved seal has been selected for purposes of illustration and description; however, it should be understood that the seal can be utilized in all types of valves having a stationary seat and a valve member that is withdrawn therefrom in the open position, such as relief valves, check valves and other various types of poppet valves.

The valve 10 has a body 12 provided with flow passages 14—16. The ends of the flow passages are provided with means for connecting the valve to a flow system as is well known in the art.

Intersecting the flow passages 14—16, there is a structural formation 18 which has a portion 20 aligned with an opening 22 in top of the body 12. The portion 20 is machined to receive a stationary valve seat ring 24 which may be held in position by a snap ring 26 or other retaining means. The outer circumference of the seat ring 24 is provided with a circumferential groove 28 in which is positioned an O-ring 30 sealing the outer surface of the seat ring 24. The inner wall 32 of the seat ring 24 is provided with a slight taper.

Mating with the valve seat 24 is a cup-shaped valve member 34 controlled by a stem 36 which extends through a bonnet 38, which closes the opening 22. The movement of the stem 36 may be regulated by a diaphragm (not shown) or any other of the well known means for controlling valves of this type.

The cup shaped valve member 34 is comprised of a cylindrical wall 38, a bottom 40 having a cylindrical portion 42 of greater diameter than the cylindrical wall 38 and a conical surface 44 which is of decreased diameter and which mates with the tapered inner wall 32 of the seat 24. A shoulder 46 is formed by the juncture of the cylindrical portion 42 and the conical surface 44 and slightly below such shoulder 46 there is a circumferential groove 48 in which is positioned an O-ring 50. Attached to the bottom 40 is a circular plate 52. A circumferential pocket 54 is formed between the bottom 40 and plate 52. Another pocket 56 is formed in the shoulder 46. A lipped or L-shaped band 58 of resilient deformable material, such as "nylon," "Teflon" or other similar material, having an inwardly projecting lip 60 is encompassed about the conical surface 44 covering the O-ring 50. The top of the band 58 is positioned in the pocket 56 and the lip 60 is positioned in the pocket 54. Both the top and bottom of the lipped band are held captive by the pockets so that flow through the valve will not disengage the band. However, the ends of the band are not clamped and pressure from either direction can flow behind the band 58 and energize the O-ring 50 which enables the O-ring to effect a bubble-tight seal, see Fig. 2. The inner wall 62 of the pocket 56 may be roughed so that as pressure flows against the band 58, the pressure will not force the band 58 into sealing engagement with the wall 62 and prevent the passage of fluid to the O-ring 50. Since the plate 52 is not in sealing engagement with the bottom 40, it has not been necessary to roughen the upper surface of the pocket 54; however, if desired, such surface may be roughened.

As is shown in Fig. 2, when the valve member 34 is engaged with the seat 24, pressure flowing in either direction will enter behind band 58 and will energize O-ring 50, causing it to move into the corner of its groove opposite from the direction of flow. Movement of the O-ring being stopped by the opposite wall, pressure will increase the effective diameter of the O-ring thereby forcing the resilient band 58 into intimate contact with the surface 32 of the seat 24 effecting a bubble-tight seal. As can be seen in Fig. 2, the shoulder 46 will strike the top of the stationary seat 24 and restrict movement of the valve member 34. With such construction the band 58 is not required to carry any load and acts as a sealing member and not a seating member. Also, the danger of pinching off the band and preventing pressure from reaching the O-ring 50 is alleviated. In the event that the seal formed by the O-ring 50 and band 58 is destroyed or ruptured, the metal to metal contact of the stop 46 and top of the seat 24 will form a secondary seal.

As previously explained, the above-described seal can be utilized in all of the various types of poppet valves, and it will effect a bubble-tight seal with a minimum of force on the valve member. While any reasonable taper may be used for the valve member and seat, it is desirable to maintain a minimum taper since the seal in opening against flow attempts to hold as long as possible and if a slight taper is used, any stretching of the band will be kept to a minimum.

The advantage of maintaining a small taper in the valve member 34 and seat 24 is more pronounced when the present seal construction is used in a balanced control valve such as shown in Fig. 1, and is especially important where there may be flow in either direction. In such valves, it is necessary to balance the seating area to prevent leakage in either direction by an unseating of the valve member due to unbalance. To accomplish this, the area of the balancing cylinder and the area of the seating area must be as equal as possible to minimize unbalancing forces. The area of the stem and other minor variations may be balanced by a spring 64; however, the amount that can be so compensated is limited.

One difficulty in accurately ascertaining the seating area is that a valve may not always seat at exactly the same place. For example, even with the present seal construction, the seal might be established at any point along the cross section of the O-ring 50, see Fig. 2, where the seal could be any place between $a$ and $b$. As can be seen, the seating area will be greater if the valve seals at $a$ rather than at $b$. Actually a straight surface would be desirable, but then all parts would have to be in perfect alignment or the valve member may catch. Also, you would have a sliding motion along the entire width of the seat. However, if you have a slight taper, you obtain the benefit of the guiding factor of the taper, the amount of sliding contact is decreased and realistic manufacturing tolerances are possible. A 5° taper has been selected; however, if desired, a smaller or greater taper depending on size, pressure and service may be used. With a 5° taper the change in diameter of each $1/16''$ of depth is approximately .011", and if the taper is increased the change in diameter will be greater. The area produced by this change in diameter must be balanced. Assuming a 4" valve with a 3¾" inside diameter seat, each .011" change in diameter will result in a change in area of approximately .065 square inches. If the pressure is 250#, it will mean a compensating factor of 16.2# and if the pressure is 1000#, it will mean a compensating factor of 65#. As mentioned before, this factor can be compensated for by the spring 64. However, if the compensating factor is too great, it can be seen that the size of the spring would be prohibitive. Therefore, it can be seen that the taper should be kept to a minimum.

To balance the valve 10, the valve member is cup-shaped and the area of the circumferential wall 38 equals the seating area. The cylindrical wall 38 is positioned in a cylinder 66 formed in the bonnet 38. An O-ring 68 is positioned about the top of the cylindrical wall 38 to form a balancing chamber. A multiplicity of holes 70 are located in the bottom 40 of the valve member to permit back pressure to enter the balancing chamber. Back pressure will enter through the holes 70 and the pressure on both sides of the valve member 34 will be equal and there will be no tendency for the valve member to be moved from its seat by back pressure. Therefore, the valve will not leak even when there is back pressure in the system.

Generally speaking, the invention relates to a novel O-ring type seal construction which can be utilized on the valve member of a poppet type valve. The seal will provide a bubble-tight seat without requiring undue force upon the valve member.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A seal for a poppet type valve in which a movable tapered male valve member coacts with a stationary tapered female valve seat, said seat comprising an O-ring positioned in a circumferential groove about the male valve member, a band of deformable material encircling said O-ring, means holding the band loosely captive whereby fluid from either direction can enter behind said band to energize the O-ring, while at the same time said band and O-ring are held secure against displacement.

2. The seal specified in claim 1 characterized in that the band of deformable material has an L-shaped cross section and the top of the vertical leg is secured in a pocket formed in the valve member above the O-ring, and the end of the horizontal leg is secured in an annular groove in the valve member below the O-ring.

3. A seat and seal construction for a poppet type valve in which a movable male valve member coacts with a stationary female valve seat, said seat and seal construction comprising the male member being provided with a stop which limits the male member's engagement with the female valve seat, an O-ring positioned in a circumferential groove about the male valve member, a band of deformable material encircling said O-ring, means holding the band loosely captive whereby fluid from either direction can enter behind said band to energize the O-ring, while at the same time said band and O-ring are held secure against displacement, the said stop limiting the valve member's entry into the valve seat so that the said band is not required to carry any load but is only required to act as a seal member.

4. The seat and seal construction as specified in claim 3 characterized in that the valve member and seat have corresponding tapers.

5. The seat and seal construction specified in claim 4 characterized in that said taper is approximately 5°.

6. A seat and seal construction for a poppet type valve in which a movable tapered valve member coacts with a stationary tapered valve seat, said seat and seal construction comprising the male member being provided with a stop which contacts the top of the valve seat to limit the engagement of the valve member with the seat, the valve member being also provided with a circumferential groove in the portion entering the valve seat, an O-ring positioned in said groove, an L-shaped band of deformable material encircling the O-ring and portion of the valve member entering the valve seat, an annular pocket in the stop and a circumferential groove in the bottom of said valve member, the top of the vertical leg of said band positioned in the pocket and the horizontal leg of said band extending into the groove whereby the band is held captive against displacement and at the same time allows fluid to flow in back of said band from either direction to energize the O-ring and effect the seal.

7. A balanced control valve comprising a housing having an inlet port and a communicating outlet port with valving means interposed therebetween, said valving means comprising a stationary valve seat having a tapered seating surface, and a movable tapered valve member, the taper of the valve seat and valve member being approximately 5°, coacting with said seat to stop flow in the valve closed position, an O-ring positioned in a groove encircling the valve member, a band of deformable material encircling said O-ring, means holding the ends of the band loosely captive to allow pressure to reach the O-ring and at the same time securing the O-ring and band against displacement, the valve member being provided with a balancing cylinder which approximates the seating area, means to allow fluid on the downstream side of the valving means to enter the balancing cylinder, and means to operate such valve.

8. A balanced control valve comprising a housing having an inlet port and an outlet port with a valve chamber interposed therebetween, a stationary valve seat having a tapered seating surface located in said valve chamber, a movable tapered valve member engaging said valve seat to stop flow in the closed position and which can be withdrawn from said seat to permit flow in the open position, means to operate said valve member, the taper of said seating surface of valve member being held to a minimum so that the rate of change of seating area is correspondingly held to a minimum, the seal for said valve member being an O-ring positioned about the valve member and a band of deformably material encircling said O-ring to prevent its displacement, means on the valve member to hold the band loosely captive so that fluid from either direction can flow behind said band and energize the O-ring and at the same time secure the band against displacement, stop means on said valve member co-operating with the valve seat to limit entry of said valve member into the seat so that the seal remains pressure acting, a sealed chamber above said valve member, a portion of said valve member forming a balancing piston, means to permit flow from the underside of said valve member to enter the balancing chamber and balance the valve member against back flow.

9. A valve comprised of a housing having an inlet and an outlet port with a valve chamber interposed therebetween, a stationary valve seat having a tapered seating surface located in said valve chamber, a tapered valve engaging the seating surface of said valve seat in the closed position and being withdrawn from contact with said seat in the valve open position, means to operate said valve member, pressure acting sealing means comprising an O-ring positioned about the portion of the valve member which is in engagement with the valve seat in the closed position, a band of deformable material encircling said portion of the valve member securing the O-ring against displacement, means on the valve member to secure the band against displacement while at the same time permitting fluid to flow behind said band to energize the O-ring, means on the valve member co-operating with the valve seat to limit entry of the valve member into the valve seat whereby the band and O-ring are not compressed.

10. The valve specified in claim 9 characterized in that balancing means are provided whereby the valve member is balanced against back pressure, and the taper of the valve seat and valve member is kept to a minimum so that the rate of change of seating area resulting from a different point of seating is maintained at a minimum.

References Cited in the file of this patent
UNITED STATES PATENTS 2,720,219    Grove                Oct. 11, 1955

FOREIGN PATENTS 678,371    France                of 1930

UNITED STATES PATENT OFFICE
CERTIFICATE OF CORRECTION

Patent No. 2,886,283                            May 12, 1959

Paul J. Natho

It is hereby certified that error appears in the printed specification of the above numbered patent requiring correction and that the said Letters Patent should read as corrected below.

Column 4, line 24, for "seat", second occurrence, read -- seal --; column 5, line 32, for "deformably" read -- deformable --.

Signed and sealed this 20th day of October 1959.

(SEAL)
Attest:

KARL H. AXLINE                                 ROBERT C. WATSON
Attesting Officer                              Commissioner of Patents